Figure 1:
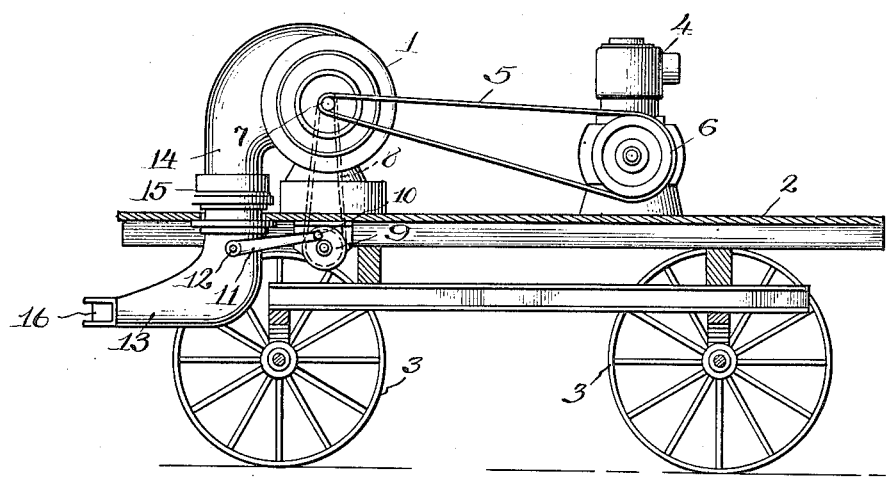

W. M. WILLIAMS.
METHOD OF CAUSING FECUNDATION OF PLANTS.
APPLICATION FILED MAR. 5, 1921.

1,438,803.

Patented Dec. 12, 1922.

Inventor,
William M. Williams
By Walter A. Scott
Attorney.

Patented Dec. 12, 1922.

1,438,803

UNITED STATES PATENT OFFICE.

WILLIAM M. WILLIAMS, OF SEATTLE, WASHINGTON.

METHOD OF CAUSING FECUNDATION OF PLANTS.

Application filed March 5, 1921. Serial No. 450,023.

*To all whom it may concern:*

Be it known that I, WILLIAM M. WILLIAMS, a citizen of the United States, residing at Seattle, in the county of King and State of Washington, have invented certain new and useful Improvements in Methods of Causing Fecundation of Plants, of which the following is a specification.

The object of my invention is to increase the yield of seed of certain plants, particularly alfalfa. My experiments and the practical use which I have heretofore made of the invention have been in connection with the alfalfa plant, and while in the following description I refer to the use of my improved method and apparatus in connection with that plant the invention is not limited to that particular use.

The invention described herein is an improvement upon the method and apparatus described and claimed in my United States Patent No. 1,306,209, granted June 10, 1919.

The stamen of the alfalfa blossom is contained in a pod between two very small leaves and opposing a larger leaf. My investigations indicate that for fertilization it is not only necessary that the pod be broken when the blossom is in a mature stage, but that it be broken suddenly in such a way that the stamen will snap out of the pod and strike the opposing leaf with considerable force. When the pods are damp such sudden opening and snapping out of the stamens does not take place. A gradual opening of the pod with gentle emergence of the stamen does not seem to effect fertilization. The effectiveness of the sudden springing of the stamen from the pod and its impact with the opposing leaf appears to be due either to the fact that the impact separates some of the pollen from the stamen in the form of a minute cloud of dust or to the fact that the impact drives some of the pollen into the stamen. In any event the sudden bursting of the pod and resulting impact of the stamen against the leaf seem to be the vital factors in the production of a maximum crop of seed.

The invention described in my prior United States patent above referred to was a method of causing fertilization by means of an artificially produced current of air "the velocity of which is sufficient to drive the pod inclosing the stamen to impact with other pods or members of the plant with a force bursting the pod open sufficiently for releasing the stamen therefrom." Subsequently, however, I have discovered that fertilization can be increased to a much greater extent by subjecting the plants to an irregular or fluctuating force or series of impulses in such manner as to cause the plants to whip to and fro. This effect may be brought about in a variety of ways, as by an intermittent air blast, by a continuous air blast intermittently directed upon the plants, by a plurality of air blasts which successively impinge upon the plants, or by mechanical means, such as a rotary or reciprocatory beater imparting successive blows to the plants. I have used several forms of apparatus for the purpose. Generally speaking, any form of apparatus that will throw a blast of air against the plants in an irregular manner or impart a succession of blows will effect the desired purpose.

For the purpose of producing an air blast I have used a blower operated by a gasoline engine and delivering the air current through a flexible pipe or a pipe provided with a flexible elbow. By moving the outlet end of the pipe or nozzle up and down or from side to side, preferably the latter, the plants were subjected to a succession of gusts of air causing the plants to sway to and fro with considerable violence. In colloquial language the air gusts slap the plants back and forth with a degree of violence almost reaching the breaking point and the result is practically complete fertilization of the blossoms.

Another form of apparatus for producing the fluctuating currents consists of a blower, or blowers, mounted on a vehicle and provided with a plurality of outlets or nozzles spaced at suitable distances in a series from front to rear of the vehicle in such a manner that when the apparatus is moved through a field the blossoms are successively subjected to the air blasts from the several outlets. As the first outlet, i. e. the one nearest the front of the vehicle, comes opposite a plant the air current violently blows the plant down, and as the first outlet passes by the plant it springs back to and beyond its erect position just in time to receive the air blast from the next outlet to the rear, whereupon it is again violently bent downwardly and again recovers in time to receive the blast from the third outlet, and so on, receiving as many air gusts as there are air outlets.

It will be apparent that the application of my improved process is independent of any particular form of apparatus and may be practised by the use of any mechanism capable of directing a succession of impulses, which impulses may be either mechanical blows delivered by some form of beater, or an air current that is irregular or fluctuating either in force or direction or both, or an intermittent air current. In referring to air currents in the claims I use the word fluctuating to designate all of the types of air currents referred to herein, including both the irregular and intermittent currents. The fluctuations in the air currents produced as above described are very sudden as the full force of the blast is turned upon each plant instantaneously and terminates instantaneously, the effect of which is to subject the plants to a violent shock at the moment each blast impinges upon them and a second violent shock at the termination of each blast when the plants by virtue of their resilience suddenly spring back to and beyond their normal position. The successive impulses, whether imparted mechanically or by air currents, are separated by sufficient time intervals to permit the plants to oscillate by virtue of their resiliency in a direction opposite to the movement imparted by the impulse whereupon the succeeding impulse further accelerates the whipping movement or to and fro oscillation of the plants.

Figure 2:
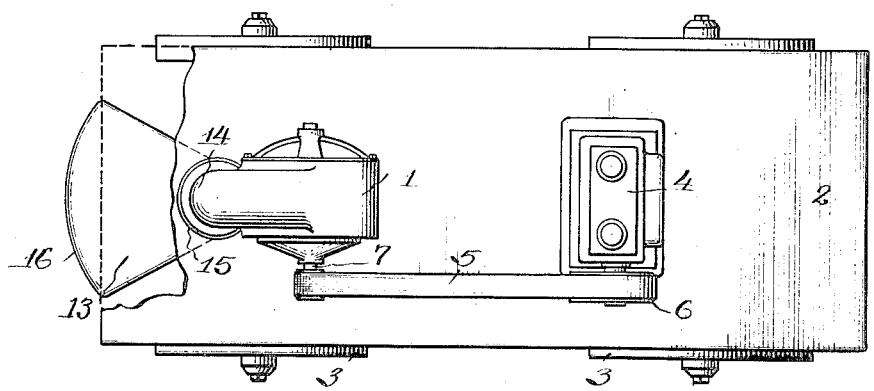

In the drawing Fig. 1 is a side elevation of one form of apparatus by which my process may be applied, and Fig. 2 is a plan view of the same.

The apparatus illustrated comprises a blower 1 mounted on a platform 2, which, with the wheels 3, constitutes a vehicle designed to be drawn through the field. The blower may be operated by any suitable motor such as the gasoline motor 4, conventionally illustrated. A belt 5 transmits power from the motor pulley 6 to the blower pulley 7, thus driving the blower, and a second belt 8 transmits power from a pulley mounted on the blower shaft to pulley 9 carried by a shaft mounted on the platform 2. The blower is provided with a downwardly directed outlet pipe 14 which is connected by a swivel joint 15 to an elbow spout member 13 which extends downward through an opening in the platform 2, and then substantially horizontally to its outlet end in order that the air current from the opening may have a substantially horizontal direction. The swivel joint 15 permits the spout 13 to have a rotatory movement in a horizontal plane. By imparting an oscillatory movement to elbow 13 upon the joint 15 the air current emerging from the spout outlet 15 will sweep to and fro over the plants imparting successive impulses thereto. The spout member 13 may be oscillated manually or by the means illustrated, which comprise a link 11 loosely pivoted at 10 and 12 to the pulley 9 and spout member 13, respectively, and serving to oscillate the spout by power from the motor 4.

As set forth in my prior patent above referred to numerous theories have been advanced regarding the agencies by which nature brings about the fertilization of alfalfa blossoms. None of the theories with which I am acquainted account for the variations in seed production in different localities and different years. Wind, rain and insect action have by different investigators been considered the effective agencies, but as the variations in these agencies in different localities and different seasons do not correspond with the variations in seed yield the true explanation of nature's method does not seem yet to have been arrived at. While some pods may be broken by wind action wind cannot be nature's sole effective agency for the reason that as between different localities and different seasons no sufficiently close connection can be traced between differences in the prevailing winds and differences in seed yield. The reason for the ineffectiveness of wind and the lesser effectiveness of my prior patented method as compared with that described herein lies in the fact that the maximum effect of air currents or mechanical impulses is only attained by directing them upon the plants with sudden and repeated fluctuations when the blossoms are not only mature but when they are also dry and brittle thus rendering it possible for the stamens to snap out violently when the pods are ruptured. Furthermore the fluctuations in the direction and force of natural wind currents are gradual as compared with the sudden and practically instantaneous variations produced by my method of procedure. In the method described in my prior patent above referred to reliance was placed on the direct effect of the artificially produced air current, the velocity of which was stated to be "sufficient to drive the pod enclosing the stamen to impact with other pods or members of the plant." In my improved method described and claimed herein the effective result is caused by the whipping to and fro of the plant resulting from mechanical impulses or fluctuating air currents. The direct action of the air current when used, upon the pod as the means of driving it against adjacent parts of the plant and thus rupturing it, as described in my prior patent, I have found to be of comparatively minor importance, for the reason that the blossom is simply moved as an entirety with comparatively little relative movement between the pod and adjacent parts. In the method described herein the mechanical impulses or fluctuating air current cause the plants to whip to and fro violently, and the sudden changes in the direction of movement of the plants cause the impacts between the pods and adjacent parts that effect the rupture of the pods and such other effects as are necessary to fertilization. The direct agency in my improved process is the whipping to and fro of the plant, while in the process described in my prior patent reliance was placed upon the air current as the direct cause of forcing the pods against the other parts of the plant.

I have heretofore stated that for the attainment of maximum fertilization it is necessary that the pod be broken suddenly in such a way that the stamen will snap out of the pod and strike the opposing leaf with considerable force. I have found that there is a period of generally about ten to twelve days during which the blossoms remain ripe and do not fall off. So far as the factor of ripeness is concerned the pods might be opened at any time during this period, but other factors are involved. If the pods are opened when in a moist condition the stamens will not snap out with sufficient force to effect maximum fertilization. So imperfect is the fertilization when the pods are moist that the impossibility of growing alfalfa seed in humid climates is an accepted fact and high authorities are on record as stating that it is useless to attempt to raise alfalfa seed in a moist climate. I have found, however, that if the pods be opened by my method on a hot, dry day during the period when the blossoms are ripe a maximum seed crop will result regardless of any generally prevailing conditions of humidity. That seed crops are not obtained from alfalfa in humid climates is simply due to the fact that fertilization to any useful extent can take place only when all of a quite large number of conditions occur simultaneously, among these conditions being ripeness of the blossoms; a dry and brittle condition of the pods such as exists on hot, dry days; and some force sufficient to rupture the pods. The absence of any one of these conditions renders fecundation impossible. In a humid climate the pods are dry and brittle only on those exceptional days when the weather is hot and dry, and as the occurrence of such days seldom coincides with the existence of the other necessary conditions there is practically never any useful degree of fecundation. I have found that even in humid climates maximum fertilization and seed production may be obtained by simply selecting for the application of my process a hot, dry day during the period of maturity of the blossoms. The failure of alfalfa seed crops in humid climates is not in general due to the absence of a hot, dry day during the period of maturity, but to the absence at that particular time of the agencies necessary to rupture the pods. In the very humid regions around Puget Sound in the State of Washington I have applied these principles and methods with the greatest success. In one instance on a warm, sunny day following a long period of rain I applied my process to a tract of alfalfa with the result that every mature blossom fertilized, a result that had never before been attained in that locality. It will be apparent, of course, that as all of the blossoms do not mature at the same time my process may be applied several times at intervals to the same field in order to cause fecundation of the successively maturing blossoms. A simple test to ascertain whether a blossom is mature consists in rubbing the point of a knife against the inside seam of the pod when dry. If the pod opens and the stamen snaps out the blossom is ripe, if the stamen comes out slowly the blossom is not ripe and not ready for the application of my process. In general it may be stated that any means used for rupturing the pods, whether pneumatic or mechanical, must be of such a nature and so applied as to permit the stamens to snap out freely. If the blossoms are held in such a way that the stamen comes out slowly and gently, or if by reason of dampness the stamens come out slowly and gently there will be no fecundation.

I claim:

1. The herein described method for effecting the fecundation of alfalfa and other plants which consists in subjecting the plants at the time of maturity and when the blossoms are dry to a succession of impulses.

2. The herein described method for effecting the fecundation of alfalfa and other plants which consists in subjecting the plants at the time of maturity of the blossoms to the action of artificially produced fluctuating air currents.

3. The herein described method for effecting the fecundation of alfalfa and other plants which consists in subjecting the plants at the time of maturity of the blossoms to the action of a series of artificially produced air currents.

4. The herein described method for effecting the fecundation of alfalfa and other plants which consists in subjecting the plants at the time of maturity of the blossoms to the action of a series of artificially produced air currents separated by time intervals.

In testimony whereof, I have subscribed my name.

WILLIAM M. WILLIAMS.